JOHN W. WINZELER
JAMES F. TUCKER
INVENTORS

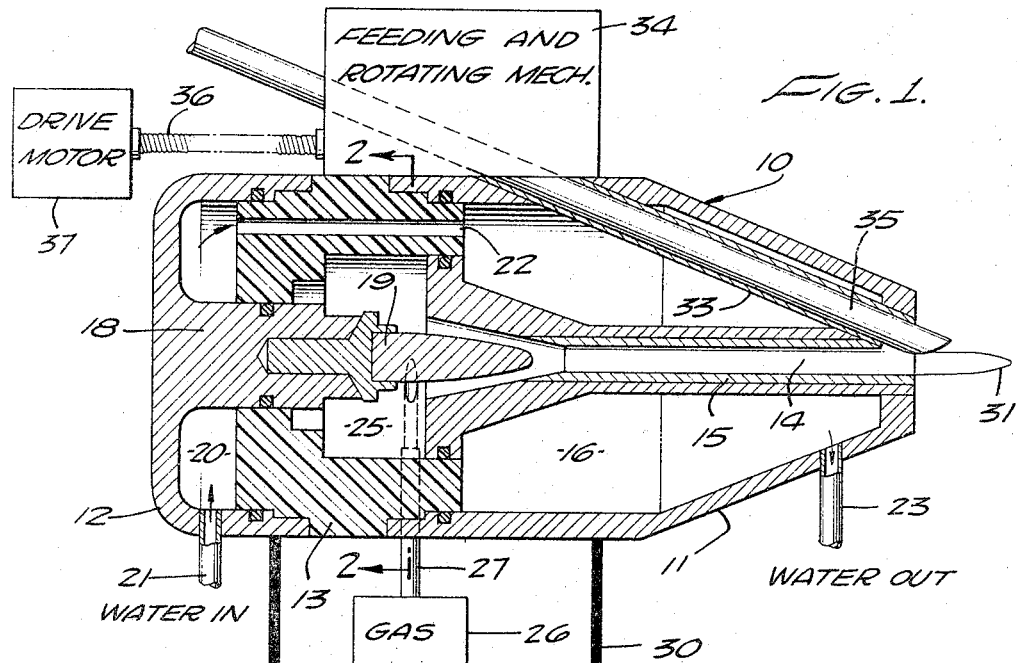

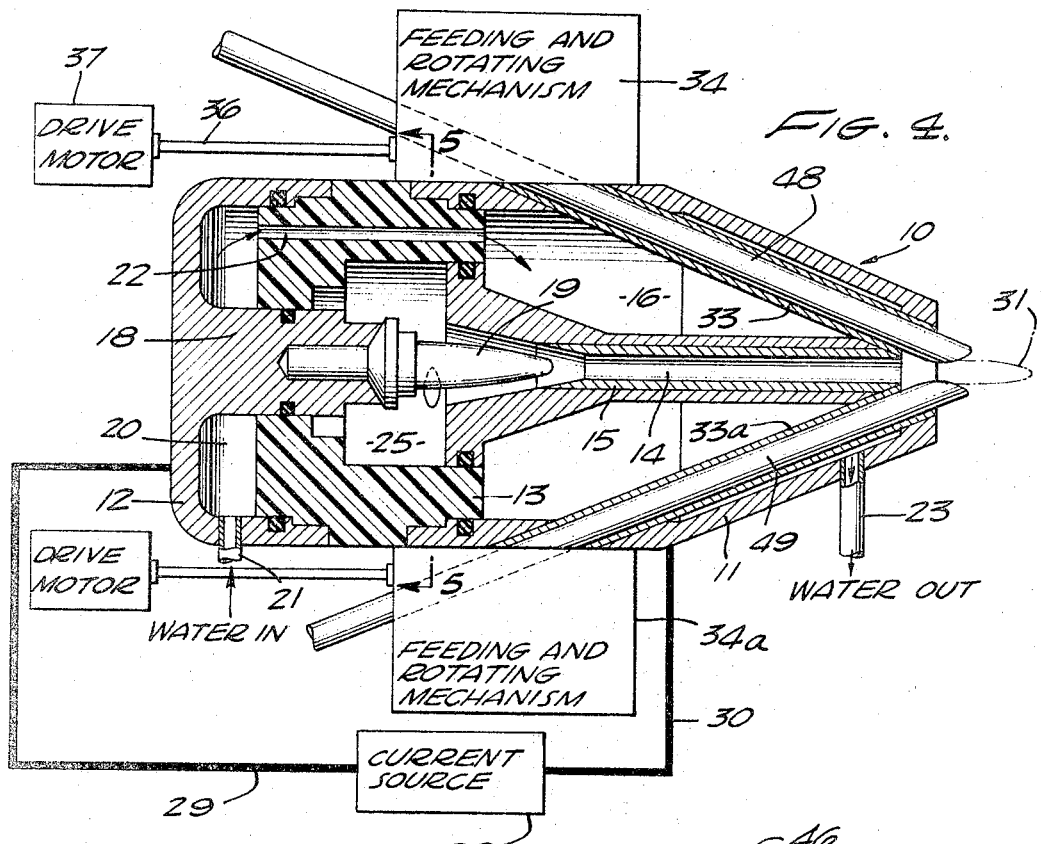
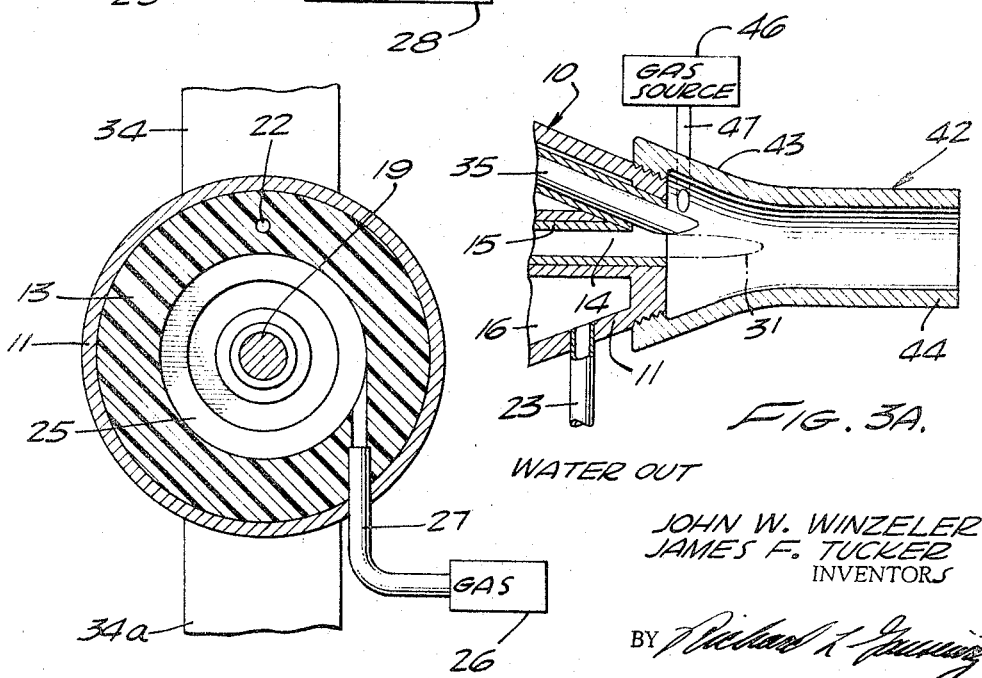

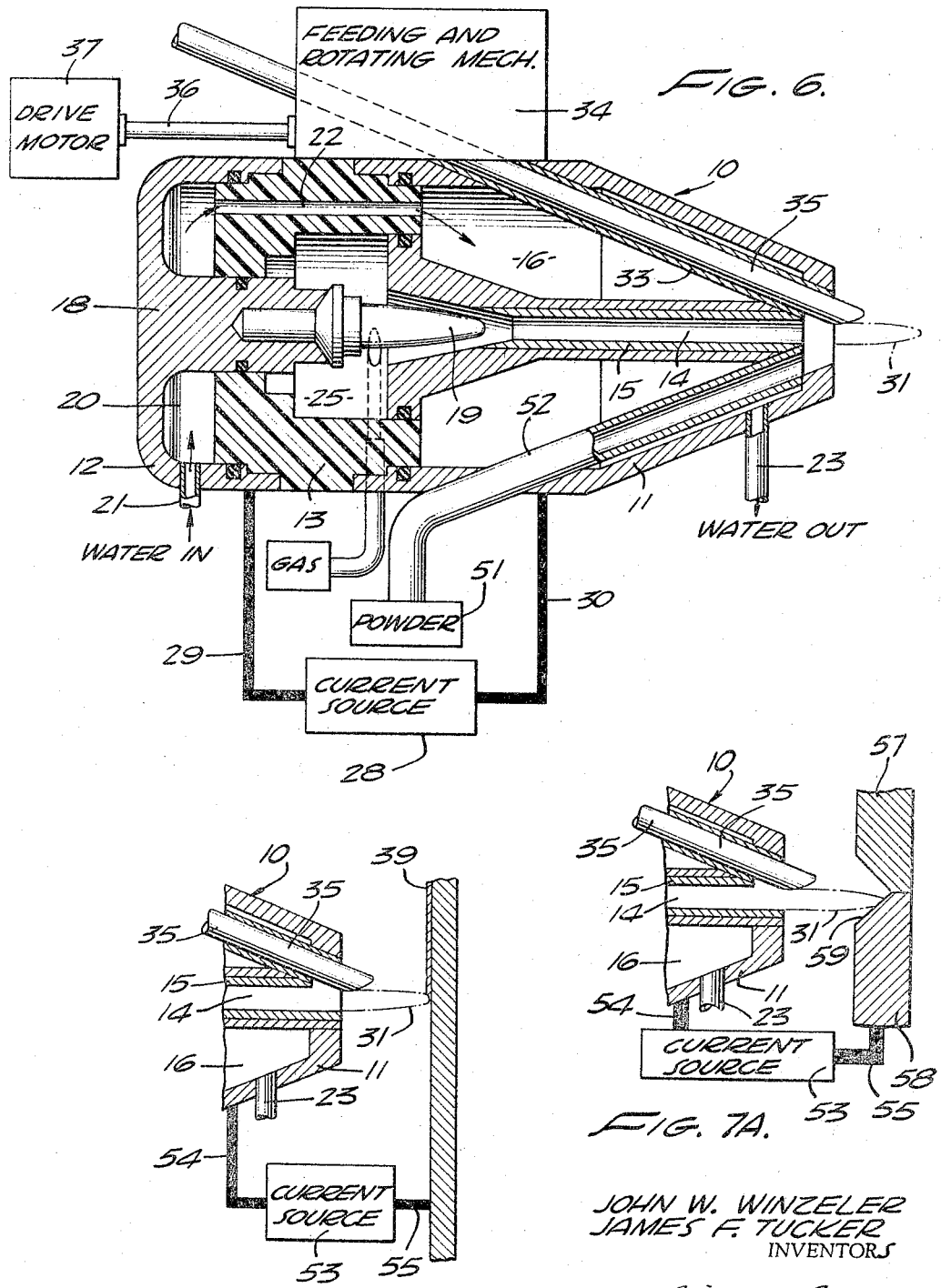

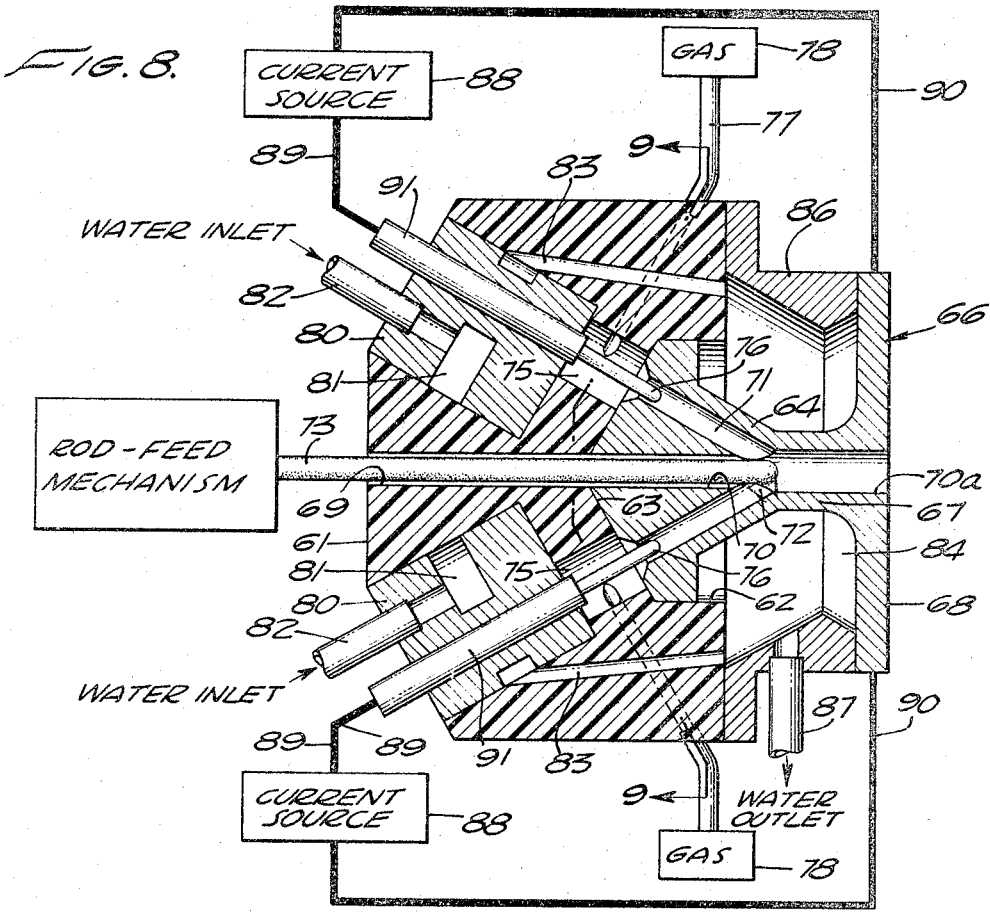
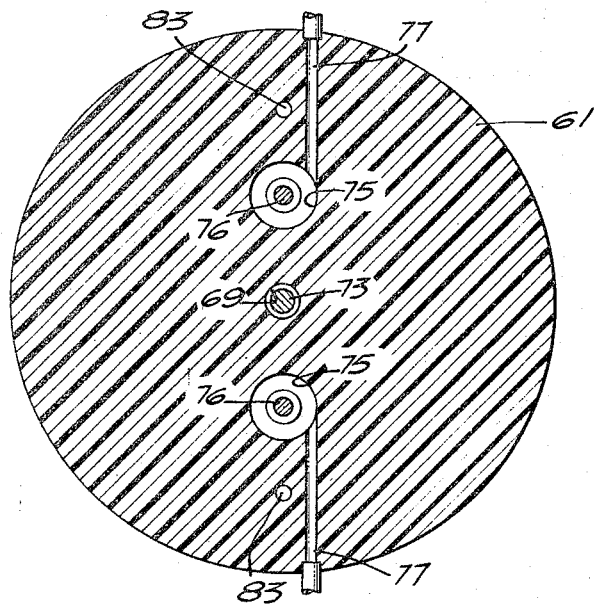

BY *Richard K. Gaumnitz*

ATTORNEY

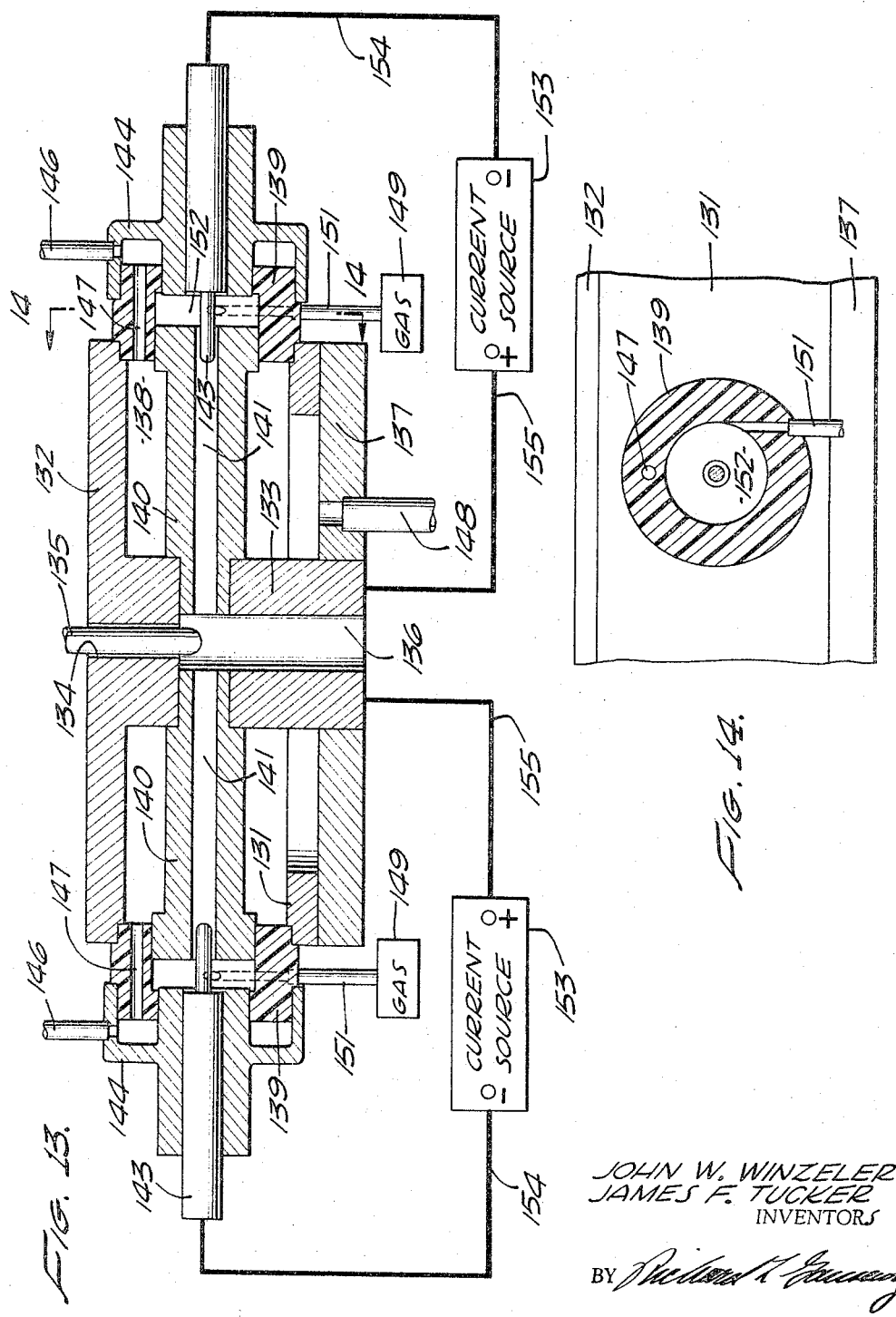

United States Patent Office 3,312,566
Patented Apr. 4, 1967

3,312,566
ROD-FEED TORCH APPARATUS AND METHOD
John W. Winzeler and James F. Tucker, Santa Ana, Calif., assignors, by mesne assignments, to Giannini Scientific Corporation, Amityville, N.Y., a corporation of Delaware
Filed Aug. 1, 1962, Ser. No. 215,220
7 Claims. (Cl. 117—93.1)

This invention relates to an apparatus and method for feeding consumable rods and converting the same into small-diameter particles adapted for various purposes including application to a substrate, welding, and others. This application is a continuation-in-part of our co-pending patent application Ser. No. 198,333, filed May 28, 1962, for Apparatus and Method for Converting Consumable Rods Into Small-diameter Particles, and for Applying Such Particles to a Substrate, now abandoned.

An object of the present invention is to provide an apparatus and method adapted to generate large quantities of small-diameter particles, particularly refractory particles, in a short period of time to thereby increase greatly the speed at which coatings may be applied onto a workpiece.

Another object of the invention is to provide an improved apparatus and method for consuming a rod, such as a rod formed of metal or ceramic, for purposes including welding, coating, and chemical applications.

An additional object is to provide an apparatus and method for stripping particles from a consumable rod, in combination with an apparatus and method for supplying heated particles from a second consumable rod or from a powder source.

Another object is to provide an apparatus for effecting rod-feed coating, welding, etc., by transfer of energy through only the external portion of a plasma jet, between a torch electrode and a workpiece.

Another object is to provide an apparatus and method whereby a plurality of plasma jets are directed obliquely into a passage, and in which a rod is fed through such passage for heating and consumption by the plasma jets.

An additional object is to provide a plasma torch wherein a plurality of rear electrodes are employed, and wherein a multiphase power source is provided to maintain arcs between such rear electrodes and/or between individual ones of such electrodes and a nozzle electrode.

A further object is to provide a materials-consumption apparatus and method wherein a plurality of plasma jets are directed into a passage or chamber through which material is fed.

These and other objects and advantages of the invention will be more fully set forth in the following specification and claims, considered in connection with the attached drawings to which they relate.

In the drawings:

FIGURE 1 is a longitudinal sectional view illustrating an apparatus constructed in accordance with a first embodiment of the present invention;

FIGURE 2 is a transverse section taken on line 2—2 of FIGURE 1;

FIGURE 3 is a fragmentary sectional view corresponding to the right portion of FIGURE 1 but illustrating the application of the particles to a substrate;

FIGURE 3A is a view coresponding generally to the right portion of FIGURE 1 but illustrating the use of a cap or auxiliary nozzle, and related gas source;

FIGURE 4 is a longitudinal sectional view corresponding generally to FIGURE 1 but illustrating a torch and method wherein a plurality of rods are fed into the plasma jet for consumption thereby;

FIGURE 5 is a transverse section taken on line 5—5 of FIGURE 4;

FIGURE 6 is a longitudinal sectional view also corresponding generally to FIGURE 1, but illustrating a torch and method wherein both a consumable rod and a powder source are employed to supply fusible material to the plasma jet;

FIGURE 7 is a fragmentary sectional view corresponding generally to FIGURE 3 but illustrating the application of a transfer power source between the nozzle electrode and the workpiece;

FIGURE 7A is a view corresponding generally to FIGURE 7 but illustrating the welding of two abutted metal plates, the filler metal being supplied by the consumable rod;

FIGURE 8 is a longitudinal sectional view illustrating an apparatus and method wherein a plurality of plasma torches are arranged obliquely to a central passage to direct plasma jets therein, in combination with means for feeding a rod through such passage for consumption by the plasma jets;

FIGURE 9 is a transverse sectional view taken on the broken line 9—9 of FIGURE 8;

FIGURE 13 is a sectional view illustrating an embodiment wherein the plasma torches are disposed diametrically opposite each other, at right-angles to the passage into which the fusible material is fed; and FIGURE 14 is a sectional view taken on line 14—14 of FIGURE 13.

Figure 10:
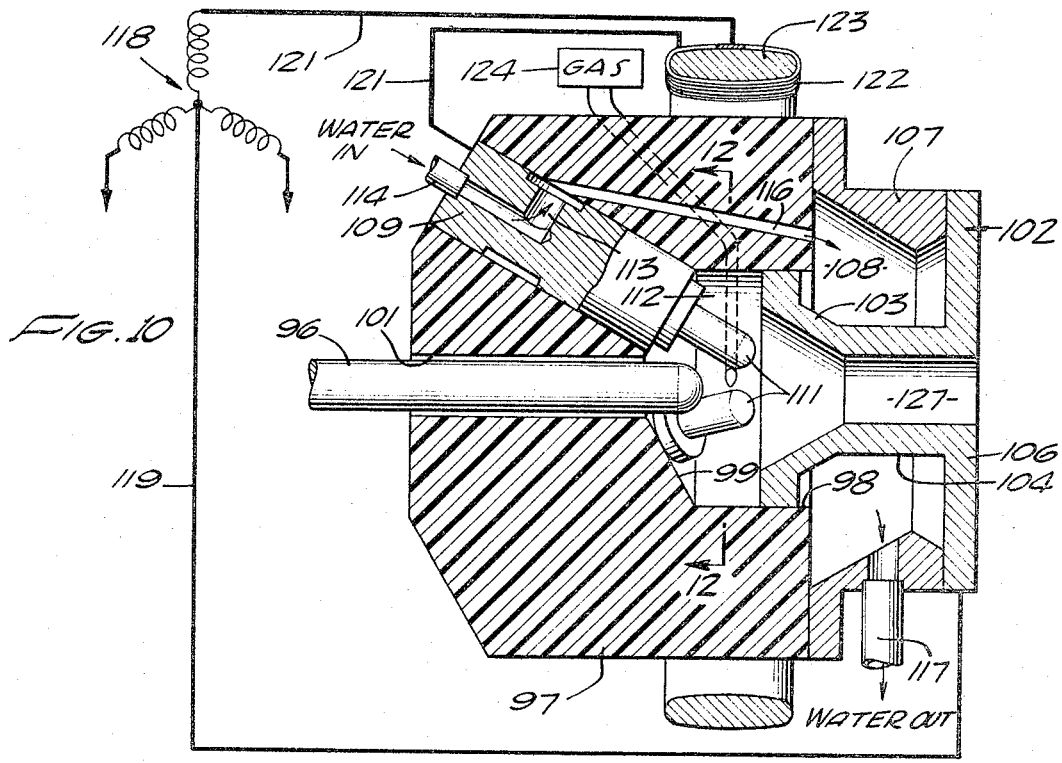
FIGURE 10 is a longitudinal sectional view illustrating an apparatus wherein a plurality of rear electrodes are employed in combination with means to feed a rod into the chamber containing the arcing portions of such electrodes, and in which a source of multi-phase A.C. power is connected to such electrodes and to a nozzle electrode.

Referring first to the embodiment on FIGURES 1 and 2, an electrical plasma-jet torch 10 is illustrated to comprise a front or nozzle electrode 11 and a back electrode 12. Such electrodes are associated with each other by means of a generally cup-shaped insulator 13, for example formed of a phenolic resin. The front electrode 11 may be composed of copper, for example, having a nozzle passage 14 provided axially therethrough. The illustrated nozzle passage is shaped with a conical inlet portion and an elongated cylindrical outlet or downstream portion, such downstream portion being shown as provided with a lining 15 composed of a suitable material such as tungsten. The front electrode is generally hollow in order that a coolant chamber 16 will be provided around the nozzle passage 14.

Back electrode 12 is generally cup shaped, having a thick central stem 18 formed axially thereof and projecting coaxially toward the nozzle passage 14. A suitable elongated insert or arcing portion 19 is mounted axially at the end of the stem 18 and projects into the conical inlet portion of the nozzle passage. In the illustrated arrangement, the arcing portion is of two-piece construction, the downstream section (formed of thoriated tungsten, for example) being generally conical and inserted into the conical portion of the nozzle passage.

Defined within the back or rear electrode, between the bottom cup wall and the rear surface of insulator 13 around stem 18, is a coolant chamber 20. Water is fed into such chamber through an inlet conduit 21 and then is passed through a passage 22 in insulator 13 to the above-indicated coolant chamber 16 for the nozzle. After thus passing in series through both of the coolant chambers, the water is discharged at 23 to a suitable drain.

The insulator 13 has an internal wall which is a cylindrical or other surface of revolution about the common axis of insert 19 and nozzle passage 14. Such surface, together with the rear face of nozzle electrode 11 and the bottom wall of the recess in the insulator, define an arc or gas-vortex chamber 25. Gas is introduced tangentially into such chamber from a gas source 26, the gas conduit being indicated at 27 and best shown in FIGURE 2. Thus, the gas flows vortically in chamber 25 and then passes vortically through the nozzle passage 14 around the arcing insert 19. This effects gas-vortex stabilization of an electric arc which is maintained by means of a suitable source 28 of current, between the downstream end of insert 19 and the wall of nozzle passage 14.

Current source 28, which is connected by the respective leads 29 and 30 to the back and nozzle electrodes, is adapted to generate a relatively high-current arc normally having a magnitude on the order of hundreds of amperes. Such arc heats the vortically-flowing gas and thus results in formation of the indicated plasma jet 31.

A tubular passage or guide 33, such as a straight copper tube, is inserted through the nozzle electrode 11 obliquely to nozzle passage 14. The guide tube 33 intersects nozzle passage 14 adjacent the front or downstream end thereof, it being pointed out that the nozzle passage 14 and guide tube 33 converge toward each other in a downstream direction.

A suitable feeding and rotating mechanism, indicated schematically at 34, is mounted on the torch 10. Such mechanism is adapted to feed through guide tube 33 a consumable rod 35, and also to rotate such rod about its longitudinal axis. The mechanism 34 may be of a conventional type employed in feeding carbons in arc lights and arc-welding apparatus, for example. It may be driven through a flexible drive 36 by means of a suitable remotely-positioned drive motor 37. It is pointed out that the mechanism 34 may also comprise two separate components one adapted to feed the rod 35 in an axial direction, the other being adapted to rotate such rod about its axis at a predetermined rate to be indicated subsequently.

Referring next to FIGURE 3, the torch 10 is illustrated as positioned adjacent a suitable workpiece or substrate 38 in order that a coating 39 will be formed thereon. Such substrate may comprise various metals, ceramics, etc.

Gas source 26 is employed to introduce gas tangentially into the vortex chamber 25, such gas flowing through the nozzle passage 14. The gas is heated by means of an electric arc which is generated between the downstream end or tip of arcing insert 19 and the wall of nozzle passage 14, so that a high-temperature plasma jet 31 is formed. The arc may be initiated in any suitable manner, for example by momentary generation of ionized gas in the vortex chamber. Water is passed in series through the chambers 20 and 16, and the connecting passage 22, in order to effect cooling of the electrodes.

The drive motor 37 and feeding and rotating mechanism 34 are operated at a suitable speed adapted to feed the rod 35 toward the plasma jet 31 and at an axial feed rate which is determined by the torch temperature and other factors, the rate being such that the end of the torch remains in the indicated position. Furthermore, the rod 35 is rotated about its axis at a substantial rate.

The result of the combined feeding and rotation of the rod, in cooperation with the plasma jet 31 which is oriented obliquely to the rod, is that particles form at the end of the rod and are stripped or peeled away therefrom. The particles are used for various purposes, such as coating the indicated substrate 38 to create the coating 39 thereon.

It is important that the angle between rod 35 and passage 14 be relatively small in order that the maximum area of the rod will be contacted by the plasma jet or flame, and in order that the droplets or particles will form properly. It has been found that a desirable angle is on the order of 22°. If the angle is excessively large, for example much greater than 25°, the deposition rate of the particles onto the substrate 38 is reduced. On the other hand, the angle should not be greatly less than about 20°, particularly since the rod 35 would then interfere excessively with the apparatus for generating the high-temperature plasma.

The exact speed of rotation of rod 35 about its axis varies in accordance with a number of factors, but is preferably relatively slow. Thus, for example, a desirable rotation speed is on the order of sixteen revolutions per minute at an axial feed rate of three-quarters of an inch per revolution, that is to say the axial feed rate is twelve inches per mintute. The rod 35 is fed continously during the operation of the torch, additional rods being added and introduced into the mechanism 34 and tube 33 as soon as the first rod melts down to a short length. Such additional rods are connected to the first one in a suitable manner.

A suitable gas from source 26 is argon containing a minor portion of hydrogen in order to increase the heat content. The current source 28 may be, for example, a D.C. source, the negative terminal being connected to rear electrode 12.

The rod 35 is relatively large in diameter, preferably having a diameter on the order of that of the nozzle passage. The rod may be composed of numerous substances such as tungsten carbide, zirconia, and the like.

It has been found that the size of the particle decreases with increased plasma velocity, and with increased heat content in the plasma. The following is given as one specific example of an apparatus wherein the heat content and plasma velocity are medium, not relatively high.

Nozzle passage 14 may be one-quarter inch in diameter, and rod 35 may also be one-quarter inch in diameter. The internal diameter of passage or tube 33 may be between about two hundred sixty and two hundred seventy-five thousandths of an inch, the angle between rod 35 and passage 14 being 22°. The rod may be made of zirconia. Current source 28 may be a D.C. source, the negative terminal being connected to lead 29, and supplying 600 amperes at 84 volts. The gas flow source 26 may be approximately six standard cubic feet per minute, the gas being 65% argon and 35% hydrogen. The pressure in conduit 27 may be approximately 68 pounds gauge.

Mechanism 34 is operated to rotate rod 35 sixteen revolutions per minute, at a feed rate of approximately three-quarters inch per revolution or twelve inches per minute.

The above produces a deposition rate greater than four pounds per hour, this being enormously greater than deposition rates achieved by prior-art apparatus, such as of the acetylene type.

It is emphasized that the particles are discrete, being small in diameter but not a vapor.

Embodiment of FIGURE 3A

FIGURE 3A illustrates an embodiment which may be identical to that of FIGURE 1, or to those which will be described subsequently relative to FIGURES 4 and 6, etc., except that an air cap or auxiliary nozzle element 42 is mounted on nozzle electrode 11 coaxially thereof. In the illustrated form, the air cap has a generally frustoconical inlet portion 43 which converges in a downstream direction, and which merges with a generally tubular outlet portion 44. A suitable gas source 46 is connected tangentially to the extreme upstream end of auxiliary nozzle or cap 42, by means of a tube or conduit 47. Alternatively, the source 46 may be connected to cap 42 by means of a plurality of conduits arranged in such manner as to achieve a laminar flow of gas.

The cap or nozzle 42 produces various benefits including aiding in stripping of the molten particles from the rod 35, and breaking up such particles into smaller sizes. Furthermore, the direction of application of the hot gas containing the molten particles is rendered more certain, the particles being applied to the substrate over an area which is more localized and well-defined than would be the case if the air cap were not employed. The gas from the source 46 may comprise air, argon, helium, etc.

In order that the sizes of particles will be reduced effectively after being stripped from the rod 35, the velocity of the gas entering cap 42 from source 46 should be greater than the velocity of the plasma discharging from passage 14.

The portion 44 of the cap may be curved, in order to facilitate coating of the interiors of hollow cylinders and various other objects.

Embodiment of FIGURES 4 and 5

Referring next to FIGURES 4 and 5, a torch is illustrated which may be identical to that shown in FIGURE 1 except that a plurality of rods 48 and 49 are employed in place of the single rod 35 illustrated in FIGURE 1. Feeding and rotating mechanisms 34 and 34a are mounted on the torch 10 and are respectively associated with the rods 48 and 49 to feed and rotate the same in the manner described relative to FIGURE 1.

The rods 48 and 49 are fed, respectively, through tubular passages or guides 33 and 33a, as described relative to guide 33 in FIGURE 1. The angular relationships, speeds of feeding and rotation, etc., may be identical to those described relative to FIGURE 1.

It is to be understood that a substantial number of rods, for example three or four, may be employed in place of the two rods 48 and 49 which are illustrated. The number of rods is limited only by the physical size of the torch.

The use of a plurality of rods produces advantages including an increased deposition rate, and an increased degree of uniformity or symmetry in the plasma containing the molten particles.

It is within the scope of the invention of effect feeding of both of the rods 48 and 49 by a single feeding and rotating mechanism, it being understood that the mechanisms may be geared together or otherwise associated with each other.

Embodiment of FIGURE 6

FIGURE 6 illustrates a plasma torch and method which may again be identical to that described relative to FIGURE 1, except that powder is fed to the plasma jet simultaneously with feeding of the rod 35 thereto. Thus, a suitable source 51 of powder is connected to a tube or conduit 52 which extends to and through the torch 10. For example, the conduit 52 may be similar to the passage or guide 33 except that it is oriented diametrically oppposite thereto. The tube 52 intersects nozzle passage 14 adjacent the downstream end thereof, in the vicinity of the forward end of the consumable rod 35.

A suitable carrier gas may be employed, in a manner well known to the art, to feed metal or ceramic powder through the tube 52 to the plasma jet 31, such metal or ceramic being fused by the jet and augmenting the supply of particles which are stripped from rod 35.

It is pointed out that a plurality of powder sources and conduits may be employed, and that a plurality of rods 35 may also be employed, the number depending upon factors including the physical size of the apparatus. It is also pointed out that, in this and other embodiments, the same or different materials may be fed into the plasma jet 31. In those instances where different materials are fed into the jet, alloying occurs in the jet and/or on the surface of the substrate or workpiece to which the molten particles are applied.

Embodiment of FIGURE 7

FIGURE 7 illustrates an embodiment which may be identical to that of FIGURE 3, except that an auxiliary or transfer current source 53 is connected, by means of leads 54 and 55, to nozzle electrode 11 and workpiece 38, respectively.

Application of current source 53 effects maintenance of a transfer arc through the plasma jet 31 between the nozzle electrode and the workpiece, thereby adding greatly to the amount of heat available to heat both the workpiece and the molten particles of ceramic, metal, etc. It is to be understood that the transfer current source 53 may also be employed with the torches shown in FIGURES 4 and 6. Also, the cap or auxiliary nozzle 42 shown in FIGURE 3A may be employed in the embodiment of FIGURE 7.

Embodiment of FIGURE 7A

The embodiment of FIGURE 7A is identical to that of FIGURE 7, except that the workpiece comprises two abutted metal plates 57 and 58 instead of the substrate or workpiece 38. Such plates 57 and 58 are beveled, at 59, in conventional manner.

In performing the method of the embodiment of FIGURE 7A, the torch 10 is so oriented that the plasma jet 31 and the molten particles enter the V-groove formed between the abutted beveled plates 57 and 58. Thus, the consumable rod 35 is employed to supply filler metal to the weld puddle. The power supplied to the torch 10, and the power supplied by the transfer current source 53, are adapted to effect fusion of the abutted regions of workpiece 57 and 58 to a substantial depth.

As previously noted, the cap or auxiliary nozzle 42 shown in FIGURE 3A may also be employed in the present embodiment, the gas source 46 then supplying a shielding or oxidation-preventing gas. Also, it is to be understood that the torches of FIGURES 4 and 6 may be employed in place of that at FIGURE 1, so that multiple sources of filler metal are utilized. It is also pointed out that, in some instances, welding of the plates may be effected in the absence of any transfer current source such as the one indicated schematically at 53.

Embodiment of FIGURES 8 and 9

In the embodiment of FIGURES 8 and 9, a generally cylindrical insulating body 61, for example formed of a phenolic resin, is provided on one side thereof with a central cylindrical recess 62 having a conical bottom wall 63. Recess 62 and its bottom wall 63 are coaxial with body 61 and are adapted to receive a correspondingly-shaped nozzle-electrode portion 64 of a nozzle element which is indicated generally at 66. In addition to its portion which is shaped generally correspondingly to the recess 62, nozzle element 66 has a central stem portion 67 and a disc-shaped forward flange portion 68.

A passage 69 is formed coaxially of body 61 and communicates with a corresponding passage 70 in the nozzle element 66. Such passage 70 has a downstream portion 70a which is somewhat larger in diameter than the upstream portion of passage 70, being adapted to receive plasma and fusible material delivered thereto through the passages 69 and 70 and through first and second plasma or nozzle passages 71 and 72.

The nozzle passages 71 and 72 extend through the nozzle-electrode portion 64 of nozzle element 66 and are oblique to the aligned passages 69–70, the angle therebetween being preferably small as was described relative to the embodiment of FIGURE 1. Passages 71 and 72 are symmetrical relative to each other about the central passage 69–70, and are adapted to deliver plasma to the end of a consumable rod 73 which is fed through the passage 69–70 by a suitable rod-feed mechanism. Such rod-feed mechanism may be adapted to effect both axial feeding of the rod 73 and rotation thereof about its longitudinal axis.

The plasma passages 71 and 72 communicate coaxially with cylindrical gas-pressure chambers 75 which are formed in the phenolic body 61, there being beveled or frustoconical portions provided at the upstream ends of the plasma passages 71 and 72 so that they open out into the gas-pressure chambers. Mounted in each of the gas-pressure chambers, and extending into the associated plasma passage 71 or 72 coaxially thereof, is an elongated nonconsumable rear electrode 76. Gas is introduced tangentially into the gas-pressure chambers 75 through passages 77 (FIGURE 9) which communicate with suitable sources 78 (FIGURE 8) of gas under pressure.

The elongated rear electrodes 76, gas-pressure chambers 75, and nozzle electrode portion 64 combine to form a pair of plasma torches adapted to generate plasma in the passages 71 and 72 and deliver the same to the downstream end of rod 73. The plasma and molten particles of metal or ceramic (stripped from the rod) are then passed through the downstream portion 70a of the central passage through the apparatus, for application to a workpiece or for any desired purpose.

The rear electrodes 76 are mounted in metal cylinders 80, in offset relationship, the cylinders being disposed in corresponding recesses in the insulating body 61. Each of the cylinders 80 is formed around the central electrode 76 with a recess or groove 81 adapted to contain cooling water. Water is introduced into such recesses or grooves by means of conduits 82. From the grooves 81, the water passes through passages 83 in body 61 to an annular cooling chamber 84 surrounding the stem 67. Such chamber is defined between flange 68 and body 61 by means of a ring element 86 having a water-outlet passage 87 therethrough.

Current sources 88 are connected to the rear electrodes 76 and to nozzle element 66, by means of leads 89 and 90, respectively. More specifically, each lead 89 connects to an enlarged cylindrical portion 91 of a rear electrode element 76, such portion 91 being slidably mounted in its associated cylinder 80 so that the position of element 76 in plasma or nozzle passage 71 or 72 may be axially adjusted.

Each of the current sources 88 may comprise a D.C. source, for example connected with the rear electrode 76 negative and the electrode element 66 positive. Alternatively, the two sources 88 may be combined into a single source, for example a center-tapped single phase A.C. source, either low-frequency or high-frequency. Furthermore a Y or delta-connected three-phase source may be employed, one terminal being connected to each of the rear electrodes 76 and the remaining terminal being connected to nozzle element 66. These are merely illustrative of numerous current sources and connections which may be utilized.

The described longitudinal adjustability of the cylinder portions 91 of rear electrodes 76 is important for various reasons. By axially adjusting a portion 91, the downstream footpoint of the arc which is maintained in each nozzle or plasma passage 71 or 72 may be located relatively accurately, thereby permitting precise determination of the temperature of the plasma which is directed against the downstream end of consumable rod 73. Normally, the downstream footpoint of the arc strikes to the wall of nozzle passage 71 or 72. However, it is within the scope of the invention to adjust each rear electrode 76 to such a forward position that the downstream arc footpoint strikes to the wall of enlarged passage 70a, the forward end of consumable rod 73 then being closely adjacent the arc so that a very high rate of melting is achieved.

The fact that each rear electrode 76 may be adjusted longitudinally to various positions, with respect to the associated nozzle passage 71 or 72, also makes it possible to operate with different gases which may require different operating voltages and arc lengths. Such gases include nitrogen, argon, helium, etc.

It is pointed out that more than two electrodes 76, passages 71 and 72, etc., may be employed, the number depending upon factors including the physical size of the apparatus. For example, the number may be three or four.

It is to be understood that each of the arcs may be started automatically by various means known to the art. For example, a capacitor-discharge circuit may be employed to produce an ionized spark discharge in each of the gas-pressure chambers 75. This initiates the main arc between the downstream end of electrode 76 and the wall of passage 71 or 72.

The described apparatus is highly useful for purposes including material spray coating, spheroidizing, descaling, reduction of various oxides, super-drying, cutting, crystal growing, thermo-chemical reactions (synthesis and analysis), carburizing, nitriding, etc.

Figure 11:
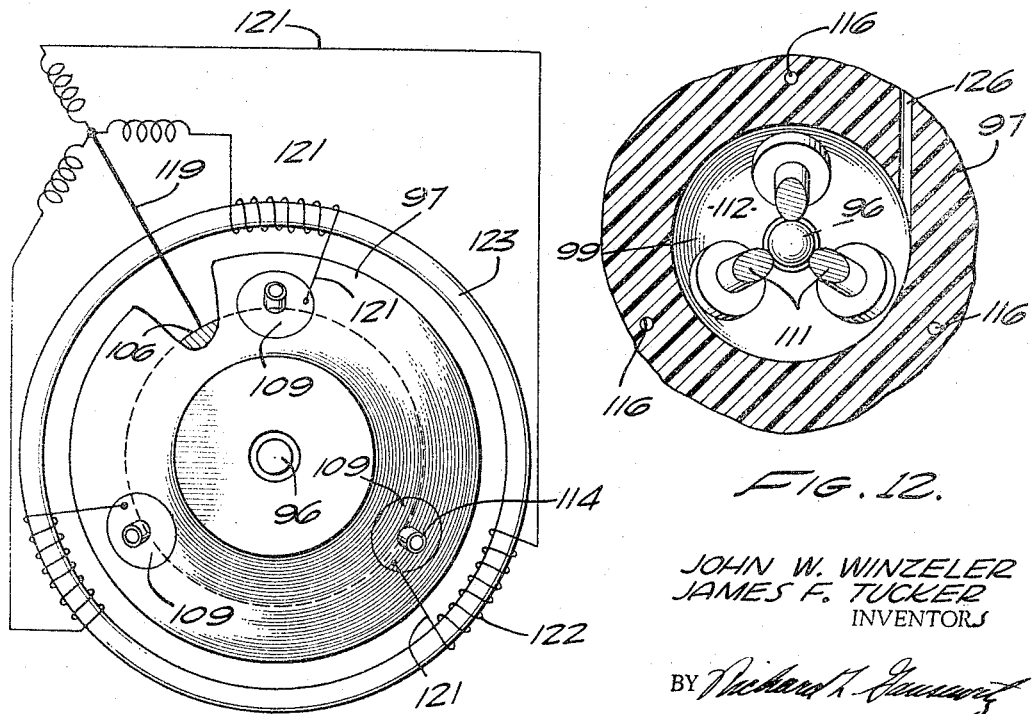
FIGURE 11 is an end view of the apparatus shown in FIGURE 10, as viewed from the left therein, and showing the magnetizable ring which is associated with the multi-phase power supply for generating a magnetic field in the arc chamber.
Figure 12:
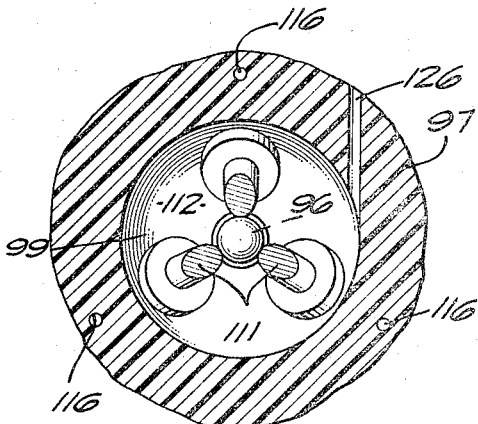
FIGURE 12 is a transverse sectional view on line 12—12 of FIGURE 10.

Embodiment of FIGURES 10–12

FIGURES 10–12 illustrate an embodiment wherein a common arc chamber containing a plurality of electrodes is employed, in combination with means to feed into such chamber a substance, such as the illustrated consumable metal or ceramic rod 96, to be heated by the arc or arcs.

The illustrated apparatus comprises a phenolic body 97 generally similar to that described relative to FIGURE 8. Such body has a cylindrical recess 98 the conical bottom portion 99 of which communicates centrally with a passage 101 adapted to receive rod 96. A nozzle element 102 is provided and has a generally conical portion 103, converging in a downstream direction, disposed in recess 98. Conical portion 103 communicates with a tubular stem 104 having a radial flange 106 at its downstream end. Flange 106 cooperates with a ring 107 to define a water chamber 108 around the stem 104 and around conical inlet portion 103.

A plurality of rear electrodes 109 are inserted into the phenolic body 97 obliquely to rod 96, three such electrodes being illustrated in FIGURE 11. The rear electrodes are equally spaced about the central rod 96, that is to say 120 degrees apart, and terminate in rounded arcing portions 111 which are disposed in a main or common arc chamber 112. Such chamber 112 is defined in the cylindrical recess 98, between the conical portion 103 of element 102, and the bottom wall 99 of the recess.

It is pointed out that in the illustrated embodiment the rod 96 has a diameter somewhat greater than the spacing between the rounded inner ends 111 of the rear electrodes, such inner ends being disposed in a plane which is perpendicular to the axis of the apparatus. However, the rod 96 may also have a smaller diameter in order that it will feed, before being consumed, to a point spaced forwardly from the plane of the electrode ends.

Each of the rear electrodes 109 incorporates a coolant passage 113 into which water is fed through a conduit 114. The water then flows through a passage 116 in body 97 and to the water chamber 108, from which it discharges through a conduit 117.

The illustrated apparatus may be supplied with electrical power in various manners, as described relative to the previous embodiment. In the illustrated embodiment, a Y-connected three-phase power source 118 is employed, having its center tap grounded through a lead 119 to the nozzle element 102. The legs of the Y are connected through leads 121 to the respective rear electrodes 109, as shown in FIGURE 11. Interposed in each such lead 121 is a coil or winding 122 which is mounted on a magnetizable ring 123 disposed around body 97 in the same plane as the arcing portions 111 of the rear electrodes. Preferably, each coil or winding 122 is disposed radially outwardly from an associated rear electrode, as illustrated.

The described circuit means not only supplies power to the rear electrodes, so that various electric arcs are maintained therebetween but also effects magnetic stabilization of such arcs. Such magnetic stabilization is caused by the rotating magnetic field created in the common arc chamber 112 as a result of the currents flowing through the windings 122. Stated otherwise, each coil or winding 122 creates lines of magnetic force which extend through the common arc chamber 112 in a direction generally axially of the consumable rod 96, thereby preventing the plasma from blowing laterally, and preventing the arcs from being extinguished. The electric arcs are also gas-vortex stabilized, by means of gas which is introduced from a source 124 through a passage 126, such passage being arranged tangentially to the common arc chamber 112 as illustrated in FIGURE 12.

The described apparatus and method produce an enormous amount of heat in the common arc chamber and in the communicating nozzle passage 127 which extends through stem 104 and through the conical electrode portion 103. Thus, any substance which is introduced into the common arc chamber, for example in the form of the rod 96, is consumed therein for a wide variety of purposes including those stated relative to the previous embodiment.

Embodiment of FIGURES 13 and 14

FIGURES 13 and 14 illustrate an embodiment wherein a plurality of plasma torches are oriented at right angles to a central passage into which a material is fed for consumption by the plasma jets. Such right-angle relationship has been found, in experiments to date relative to consumable rods, to be distinctly inferior to the oblique-angle relationship previously described. However, the right-angle relationship is satisfactory in various situations including those wherein the material is supplied to the apparatus in particulate form instead of in rod form.

In the illustrated apparatus, a large-diameter, short hollow cylinder 131 is provided with a disc-shaped cover 132 having a central tubular stem 133 which is disposed coaxially of the cylinder 131. Stem 133 has an upper passage 134 adapted to receive a consumable rod 135, such passage entering coaxially a larger-diameter lower passage 136 which extends to the bottom of the stem. The cylinder 131 has a disc-shaped bottom 137 which cooperates with the cylinder and its cover 132 in defining a water chamber 138 around the stem 133.

A plurality of generally tubular phenolic insulators 139 are mounted in openings in the wall of the cylinder 131, on opposite sides of stem 133, such cylinders being oriented with their axes perpendicular to passages 134 and 136. Disposed partially in the recesses or openings in phenolic cylinders 139 are nozzle elements or tubes 140. Such tubes extend inwardly through the water chamber 138 and through openings in the central tubular stem 133, so that the plasma or nozzle passages 141 defined therein will communicate with passage 136 as illustrated.

Elongated rear electrodes 143 are mounted coaxially of the nozzle passages 141, being adjustably mounted in housing or body elements 144 which fit around and into the respective phenolic elements 139. Water passages 146 and 147 are provided to cool the rear electrodes and to effect circulation of water through chamber 138, the water discharging through an outlet 148. A gas source 149 is provided for each torch, each such source being connected through a conduit 151 to the cylindrical chamber 152 which is defined within each phenolic element 139. Each conduit 151 is tangential to the associated chamber, as shown in FIGURE 14, so that the gas flows vortically around the elongated rear electrode 143 and then passes through the nozzle passage to the central passage 136.

Suitable current sources are connected to provide arcs between the rear electrodes and the walls of nozzle elements 140, such sources being indicated at 153 as D.C. current sources. Each source is connected through a lead 154 to a rear electrode 143, and through a lead 155 to the central tubular stem 133.

In performing the method with the embodiment of FIGURES 13 and 14, material is fed downwardly through the upper passage 134, for example in the form of the rod 135, and plasma from the nozzle passages 141 is directed against the material to cause the same to fuse or vaporize. It is to be understood that any number of plasma-generating elements may be employed, that the plasma passages may enter the lower passage 136 in different horizontal planes, that the current sources may be multi-phase, and that the electrode positions, power inputs and gas velocities may be regulated to achieve various temperatures and conditions desired for the purpose for which the apparatus is employed.

Various embodiments of the present invention, in addition to what has been illustrated and described in detail, may be employed without departing from the scope of the accompanying claims.

We claim:
1. A method of coating a substrate, which comprises directing an electrical plasma-jet torch toward said substrate in order that the plasma jet generated by said torch will be in the vicinity of one surface of said substrate, feeding a refractory rod at an oblique angle relative to said jet and into said jet in the vicinity of the downstream end of said torch, said feeding being in a direction generally forwardly relative to the direction of said jet, simultaneously rotating said rod about the longitudinal axis thereof to cause said jet to remove discrete molten particles of said rod and apply the same to said substrate, and traversing said torch and said substrate relative to each other to form a coating on said substrate.

2. The invention as claimed in claim 1, in which said rod is a refractory metal oxide.

3. The invention as claimed in claim 1, in which said rod is tungsten carbide.

4. The invention as claimed in claim 1, in which said method includes generating said jet through use of a torch current on the order of hundreds of amperes.

5. Apparatus for converting a consumable rod into small-diameter particles, which comprises an electrical plasma-jet torch adapted to generate a high-temperature high-velocity plasma jet, said jet extending from the rear electrode of said torch to the ambient atmosphere, and means to feed a rod into said jet and to rotate said rod about the longitudinal axis thereof whereby the end of said rod is consumed to form small-diameter particles, said last-named means being adapted to feed said rod into said jet at an oblique angle relative thereto, said rod converging toward said jet in a downstream direction.

6. The invention as claimed in claim 5, in which said oblique angle between said rod and said jet is less than about 25°.

7. The invention as claimed in claim 5, in which said oblique angle between said rod and said jet is between about 20° and about 25°.

(References on following page)

References Cited by the Examiner

UNITED STATES PATENTS

| | | | |
|---|---|---|---|
| 1,955,001 | 4/1934 | Hopkins | 219—8 |
| 2,922,869 | 1/1960 | Giannini et al. | |
| 2,944,140 | 7/1960 | Giannini et al. | |
| 2,945,119 | 7/1960 | Blackman. | |
| 2,966,575 | 12/1960 | Libby | 219—75 |
| 2,982,845 | 5/1961 | Yenni et al. | 219—75 |
| 3,016,447 | 1/1962 | Gage et al. | 219—76 |
| 3,055,591 | 9/1962 | Shepard. | |
| 3,179,782 | 4/1965 | Matvay. | |

FOREIGN PATENTS 131,378   2/1949   Australia.

ALFRED L. LEAVITT, *Primary Examiner.*

R. E. ZIMMERMAN, A. GOLIAN, *Assistant Examiners.*